H. C. HOPKINS.
Valves for Pumps.

No. 157,331. Patented Dec. 1, 1874.

Witnesses,
Chas H Smith
Geo T Pinckney

Inventor
Henry C. Hopkins,
per Lemuel W. Serrell
atty.

THE GRAPHIC CO. PHOTO-LITH. 39 & 41 PARK PLACE, N.Y.

UNITED STATES PATENT OFFICE.

HENRY C. HOPKINS, OF BROOKLYN, NEW YORK.

IMPROVEMENT IN VALVES FOR PUMPS.

Specification forming part of Letters Patent No. 157,331, dated December 1, 1874; application filed June 25, 1874.

*To all whom it may concern:*

Be it known that I, HENRY C. HOPKINS, of Brooklyn, in the county of Kings and State of New York, have invented an Improvement in Valves for Pumps, of which the following is a specification:

This valve is made for the water-ways of pumps; and it is designed to prevent the risk of the valve becoming jammed or obstructed in its movement, and to retain the valve in position, and render it unnecessary to finish off any portions of the valve-chest, except the valve-seat.

I make use of a metallic valve with rollers at its ends, which rollers are received within and guided by the ends of a valve-holder, so as to preserve the parallelism in the movement of the valve, and also to receive the springs, by which the valve is pressed to its seat.

Figure 1:
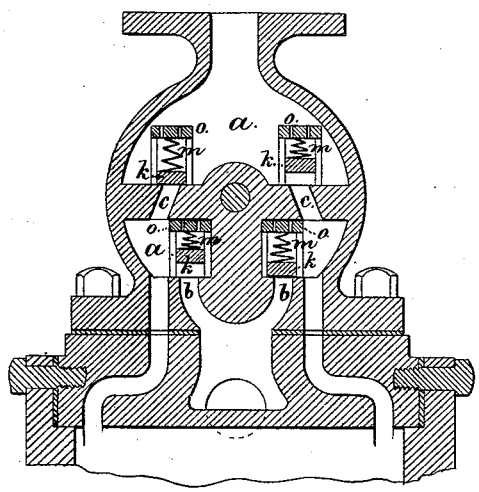
Figure 2:
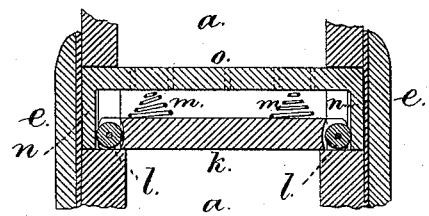
Figure 3:
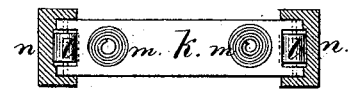

In the drawing, Figure 1 is a cross-section of the valves in the valve-chest. Fig. 2 is a section longitudinally of one of the valves, and Fig. 3 is a sectional plan of such valve.

The valve-chambers $a$, with the induction-ports $b$ and eduction-ports $c$, are of any desired character. I have represented the sides of the chamber with openings, to receive the valves endwise through them, such openings being covered by cap-plates $e$. Each valve $k$ is provided with a roller, $l$, at each end, and the valve and its rollers are received between and guided by the end pieces $n$ $n$, that are connected by the top piece $o$, and form a guiding-frame or valve-holder. The springs $m$ are between the valve $k$ and holder $o$, and the parts of the valve and holder are properly constructed and fitted before being entered in place, and the valve, when in use, opens by the pressure of the water and is closed by the springs, and the frame being of a size to occupy the space allotted to it, or else being held in place, the valve is kept in position by that holder; but the rollers at the ends of the valve prevent the risk of the valve becoming jammed or obstructed in its movement.

I claim as my invention—

The valve $k$, provided with rollers $l$ at the ends, in combination with the valve-holder $o$, having the end guiding-pieces $n$ $n$, and the spring $m$, substantially as set forth.

Signed by me this 22d day of June, 1874.

HENRY C. HOPKINS.

Witnesses:
GEO. D. WALKER,
CHAS. H. SMITH.